May 29, 1962
W. KUNZER ETAL
APPARATUS FOR THE PRODUCTION OF HYDROCHLORIC
ACID FROM WASTE GASES CONTAINING
HYDROGEN CHLORIDE
Filed Dec. 8, 1958
3,036,418
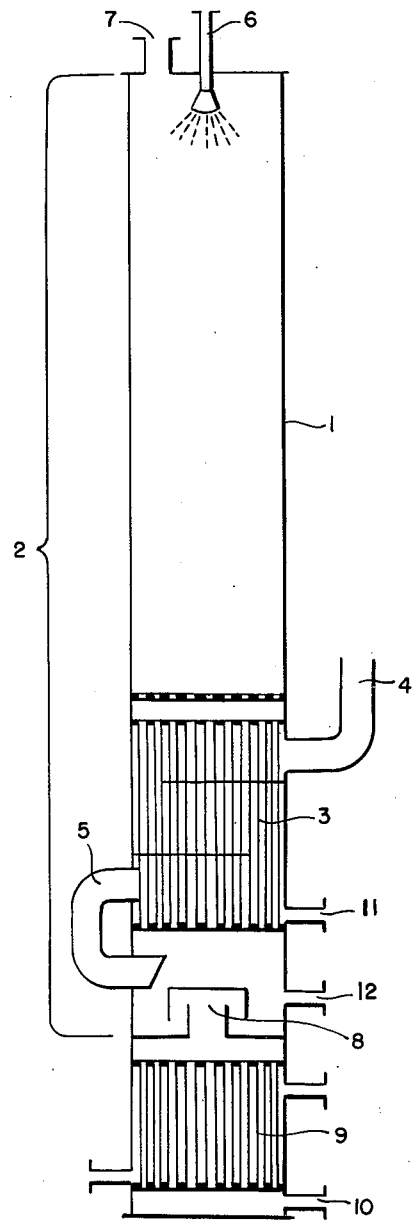
INVENTORS:
WERNER KUNZER
FRITZ LEUTERT
BY
ATT'YS

United States Patent Office 3,036,418
Patented May 29, 1962

3,036,418
APPARATUS FOR THE PRODUCTION OF HYDROCHLORIC ACID FROM WASTE GASES CONTAINING HYDROGEN CHLORIDE
Werner Kunzer, Ludwigshafen (Rhine), and Fritz Leutert, Fussgoenheim, Germany, assignors to Badische Anilin- & Soda - Fabrik Aktiengesellschaft, Ludwigshafen (Rhine), Germany
Filed Dec. 8, 1958, Ser. No. 778,749
3 Claims. (Cl. 55—71)

This invention relates to an apparatus for working up waste gases containing hydrogen chloride and impurities and originating from organic chlorination reactions.

It is known to recover hydrochloric acid from waste gases which contain hydrogen chloride and which have been obtained from organic chlorinations, by allowing the waste gas to flow upwardly through a tower filled with a suitable packing and to which an aqueous absorption liquid is supplied at the top. When working in this way there is the disadvantage that the waste gas passing to the further working up is in general saturated with the vapours of impurities contained therein and originating from the organic chlorination reaction and that there is a risk of these vapours being condensed upon the entry of the waste gas into the absorption zone of the tower. Even when only small amounts of liquid or solid condensate are thereby formed, it is not always certain that at the speed at which the hydrochloric acid flows away from the tower the said condensate will completely vaporize again before the hydrochloric acid enters the cooler through which it passes before leaving the tower. The hydrochloric acid obtained may therefore be substantially contaminated especially by substances which evaporate only slowly or of which the boiling point is so high that they are only volatile azeotropically with steam.

We have now found that the said disadvantage can be avoided by heating the contaminated gas containing hydrogen chloride, prior to the absorption, to a temperature which is above the dewpoint of the impurities. This heating above the dewpoint of the impurities may advantageously be effected by leading the gas coming from the chlorination apparatus in heat exchange relation to the hot acid flowing from the absorption zone of the tower. For this purpose it is thus only necessary to install in the absorption zone a suitable device for heating up the gases to be worked up, through which the acid produced flows downwardly. In normal operation there is sufficient heat set free by the absorption for the gas supplied to the absorption zone to be heated above the dewpoint of the impurities without any appreciable change of temperature taking place in the absorption zone. The separation of the liquid droplets or solid particles entrained with the gases containing hydrogen chloride, from these gases prior to the supply of the gases to the absorption zone is preferably also effected in the device serving for the heating up of the gases.

An apparatus suitable for carrying out the process is shown diagrammatically and by way of example in the accompanying drawing. A tower 1 has an absorption zone 2 charged with packings in which there is also installed a heat-exchanger 3 to which is supplied through a pipe 4 the contaminated gas containing hydrogen chloride and in which this gas is heated up, in heat exchange with the hot hydrochloric acid formed in the absorption zone, to a temperature above the dewpoint of the impurities contained therein. This gas then passes through a pipe 5 into the absorption zone of the tower, first completely saturates the hot acid flowing down in the heat-exchanger and is then absorbed in the packed portion of the absorption zone above the heat-exchanger by the water sprayed in at 6 with the formation of hydrochloric acid. The residual gas, which contains steam produced by the heat of absorption and organic substances, leaves the tower through a pipe 7 and is supplied to plant for the recovery of the organic substances. The hydrochloric acid flowing away from the heat exchanger 3 passes a dip seal 8 and is then cooled in a heat exchanger 9 and led away from the tower through a pipe 10 as concentrated hydrochloric acid which is practically free from organic impurities and chlorine. Condensate entrained by the gases containing hydrogen chloride can be withdrawn through a pipe 11.

In order to heat up the gas supplied to the tower when the latter is set in operation, steam is led in at 12 until the heat exchanger 3 has reached a temperature of about 80° C. When the absorption is proceeding, the said temperature is maintained by the absorption heat formed so that it is not necessary to supply steam for a prolonged period.

The heat exchanger for the heat exchange between the gases containing hydrogen chloride to be supplied to the absorption zone and the hydrochloric acid formed in the absorption zone can also be arranged in the space between the heat exchanger 9 and the dip seal 8.

The heat exchanger for the heating up of the gases containing hydrogen chloride may also be installed outside the tower in the pipe 4 and brought to the desired temperature by means of a heating medium such as steam, water, fuel, oil, diphenyl or the like.

Whereas according to the methods hitherto known there is obtained from the waste gas containing hydrogen chloride contaminated with benzene from a chlorination plant, a 30% hydrochloric acid which contains 0.2 gram of benzene per litre, the working up of the same gas according to the present invention makes possible the recovery of a 30% hydrochloric acid of which the content of benzene amounts to only 0.0015%.

In the working up of waste gases which contain carbon tetrachloride in addition to hydrogen chloride, it is possible according to the present invention to obtain a 30% hydrochloric acid of which the content of carbon tetrachloride amounts to only 0.006% as compared with a content of 0.01% in 30% acid recovered by the known methods.

We claim:
1. A method of producing substantially pure hydrochloric acid from gases containing hydrogen chloride and organic impurities which comprises passing said gases through a heat-exchanger wherein the temperature of said gases is increased above the dewpoint of said organic impurities, conveying said gas from said heat-exchanger to the lower portion of a liquid absorption zone; spraying water into the upper part of said absorption zone whereby said water absorbs hydrogen chloride and whereby said impurities in said gases remains substantially undissolved in the water.

2. In a method as claimed in claim 1, wherein the temperature of the gases containing hydrogen chloride and organic impurities passing through the heat exchanger is increased above the dew point of said organic impurities in heat exchange with the hot hydrochloric acid formed in the absorption zone.

3. In a method as claimed in claim 1, wherein the heat exchanger is maintained at a temperature of about 80° C.

References Cited in the file of this patent
UNITED STATES PATENTS

| 2,220,570 | Hurt | Nov. 5, 1940 |
|---|---|---|
| 2,235,322 | Martin | Mar. 18, 1941 |
| 2,596,785 | Nelly et al. | May 13, 1952 |
| 2,730,194 | Wohlers et al. | Jan. 10, 1956 |